United States Patent
Song

(10) Patent No.: US 11,525,204 B2
(45) Date of Patent: Dec. 13, 2022

(54) WASHING MACHINE DRIVING DEVICE, AND WASHING MACHINE AND DRIVING METHOD USING SAME

(71) Applicant: AMOTECH CO., LTD., Incheon (KR)

(72) Inventor: Duck Hyun Song, Ansan-si (KR)

(73) Assignee: AMOTECH CO., LTD., Incheon (KR)

( * ) Notice: Subject to any disclaimer, the term of this patent is extended or adjusted under 35 U.S.C. 154(b) by 255 days.

(21) Appl. No.: 17/028,222

(22) Filed: Sep. 22, 2020

(65) Prior Publication Data

US 2021/0002808 A1 Jan. 7, 2021

Related U.S. Application Data

(62) Division of application No. 15/076,981, filed on Mar. 22, 2016, now abandoned, which is a division of application No. PCT/KR2014/009540, filed on Oct. 10, 2014.

(30) Foreign Application Priority Data

Oct. 10, 2013 (KR) .................. 10-2013-0120721
Oct. 10, 2014 (KR) .................. 10-2014-0136618

(51) Int. Cl.
*D06F 35/00* (2006.01)
*D06F 37/40* (2006.01)
*D06F 37/30* (2020.01)

(52) U.S. Cl.
CPC ............ *D06F 37/40* (2013.01); *D06F 37/304* (2013.01)

(58) Field of Classification Search
CPC ........ D06F 37/30; D06F 37/304; D06F 37/32; D06F 37/36; D06F 37/40; D06F 2105/46; D06F 2105/48; D06F 33/00; D06F 33/32; D06F 33/36; D06F 33/38; D06F 35/00; D06F 35/005; D06F 35/006
See application file for complete search history.

(56) References Cited

U.S. PATENT DOCUMENTS

| 6,257,027 | B1 | 7/2001 | Imai |
| 2006/0042022 | A1 | 3/2006 | Kim et al. |
| 2011/0179584 | A1 | 7/2011 | Kim et al. |

FOREIGN PATENT DOCUMENTS

| JP | 2004216166 | 8/2004 |
| KR | 20030062556 | 7/2003 |
| KR | 20060020266 | 3/2006 |

(Continued)

OTHER PUBLICATIONS

International Search Report—PCT/KR2014/009540 dated Jan. 9, 2015.

*Primary Examiner* — David G Cormier
(74) *Attorney, Agent, or Firm* — Cantor Colburn LLP

(57) ABSTRACT

Provided are an apparatus for and a driving method of driving a washing machine in which a washing tub is rotated by an inertial force in a freewheeling condition or at a low power driving mode, and a pulsator is reversely rotated, in a state where the pulsator and the washing tub are rotated in one direction. When driving the pulsator and the washing tub in the opposite directions, the inner rotor and the outer rotor are driven in a first direction where the washing tub is rotated, to then set the inner rotor to any one of a freewheeling mode, an intermittent driving mode, and a low power driving mode, to thus rotate the washing tub, and the outer rotor is driven in one direction opposing the first direction to thus reversely rotate the pulsator.

10 Claims, 10 Drawing Sheets

(56) References Cited

FOREIGN PATENT DOCUMENTS

| KR | 20080092023 | 10/2008 |
| KR | 100898163 | 5/2009 |
| KR | 20120136081 | 12/2012 |
| KR | 20130051578 | 5/2013 |

WASHING MACHINE DRIVING DEVICE, AND WASHING MACHINE AND DRIVING METHOD USING SAME

TECHNICAL FIELD

The present invention relates to an apparatus for and a method of driving a washing machine, and more particularly, to an apparatus for driving a washing machine in which a washing tub is rotated by an inertial force in a freewheeling condition or at a low power driving mode, and a pulsator is reversely rotated, in a state where the pulsator and the washing tub are rotated in one direction, thereby minimizing energy consumption and obtaining a mutually opposite direction driving effect by a dual power drive, a washing machine using the same, and a driving method thereof.

BACKGROUND ART

In general, a direct-drive washing machine selectively rotates a pulsator and a dehydrator by using a single motor for the washing machine.

For example, a motor for a washing machine repeatedly rotates a pulsator in a forward direction and a reverse direction when the washing machine performs a laundry operation and a rinsing operation of washes, and rotates the pulsator and a dehydrator in an identical direction at high-speed when the washing machine performs a dehydration operation of the washes.

In order to rotate only the pulsator or both the pulsator and the dehydrator, by using the single motor for the washing machine, conventional washing machines include a clutch and a torque conversion unit, respectively as disclosed in Korean Patent Registration No. 10-0438616 on Jun. 23, 2004.

However, the conventional washing machine requires a torque conversion unit that performs torque conversion to provide torque needed for a washing operation and a dehydration operation from a single washing machine motor, but the torque conversion unit includes a sun gear, planetary gears, and a carrier. As a result, the configuration of the torque conversion unit becomes very complicated and the price thereof is expensive, to thereby cause manufacturing costs for the washing machine to rise up.

In view of this point, Korean Patent Application Publication No. 10-2006-20266 proposed a washing machine including: an inner tub rotatably mounted inside of a tub; a pulsator rotatably mounted inside the inner tub; a first washing shaft connected to the inner tub through the tub; a second washing shaft connected to the pulsator; and a double-rotor motor individually rotating the first and second washing shafts.

In this case, the double-rotor motor is provided with a pair of separate rotors, and a stator including a pair of windings wound around one core, and thus selectively or individually drives the pair of rotors.

However, when trying to form a strong water stream to increase cleaning capability by rotating a pulsator and a washing tub in opposite directions in a motor drive device for a washing machine using the double-rotor motor, and when the washing tub filled with a lot of laundry and water is initially started with an inner rotor having a small starting torque due to a small diameter, initial starting current is excessively consumed due to the insufficient starting torque of the inner rotor, to thus cause degradation of efficiency.

In addition, when driving the inner rotor and outer rotor in opposite directions in the general double-rotor motor, interference may be caused between loads that are connected to the inner rotor and outer rotor and move in opposite directions, and thus the current consumption may increase. In particular, excessive current consumption may be caused in the initial starting time due to insufficient torque of the inner rotor, and thus degradation of efficiency may be caused.

It is required to form a strong water stream to increase cleaning capability by reversely rotating the washing tub in one direction opposite to the rotational direction of the pulsator in a washing mode and a rinsing mode.

In general, the washing tub is filled with a lot of laundry and water, and the weight and volume thereof become large compared to the pulsator. Accordingly, the high torque driving is required in the initial startup time.

The inner rotor for driving the washing tub has generally a small drive torque as compared to the outer rotor because the inner rotor is disposed inside the outer rotor.

SUMMARY OF THE INVENTION

To solve the above problems or defects, it is an object of the present invention to provide an apparatus for driving a washing machine, in which a pulsator is reversely rotated, in a state where the pulsator and the washing tub are rotated in one direction, by sequentially driving the outer rotor and the inner rotor at the same time or at time intervals, and thus a washing tub is rotated by an inertial force at the time of blocking driving of the inner rotor or at the time of a low power driving mode, thereby minimizing energy consumption and obtaining a mutually opposite direction driving effect by a dual power drive, a washing machine using the same, and a driving method thereof.

The objects of the present invention are not limited to the above-described objects, and other objects and advantages of the present invention can be appreciated by the following description and will be understood more clearly by embodiments of the present invention.

To accomplish the above and other objects of the present invention, according to an aspect of the present invention, there is provided an apparatus for driving a washing machine, the washing machine driving apparatus comprising: a stator that is fixed to a lower surface of an outer tub and on an inner side and an outer side of which a first coil and a second coil are provided, respectively; an inner rotor that is disposed with a gap on an inner circumferential surface of the first coil of the stator and connected with a washing tub; an outer rotor that is disposed with a gap on an outer circumferential surface of the second coil of the stator and connected with a pulsator; and a control unit that applies a first drive signal and a second drive signal independently to the first coil and the second coil, wherein when the control unit drives the pulsator and the washing tub in the opposite directions, the control unit drives the inner rotor and the outer rotor in a first direction where the washing tub is rotated, to then set the inner rotor to any one of a freewheeling mode, an intermittent driving mode, and a low power driving mode, to thus rotate the washing tub, and drives the outer rotor in one direction opposing the first direction to thus reversely rotate the pulsator.

According to a second aspect of the present invention, there is provided a method of driving a washing machine including an apparatus for driving the washing machine, in which the washing machine driving apparatus includes: a stator that is fixed to a lower surface of an outer tub and on an inner side and an outer side of which a first coil and a second coil are provided, respectively; an inner rotor that is disposed with a gap on an inner circumferential surface of the stator and connected with a washing tub; an outer rotor that is disposed with a gap on an outer circumferential surface of the stator and connected with a pulsator; and a control unit that applies a first drive signal and a second drive signal independently to the first coil and the second coil, to drive the inner rotor and the outer rotor, the method comprising: when driving the pulsator and the washing tub in the opposite directions to each other, driving the inner rotor and the outer rotor in a first direction where the washing tub is rotated; rotating the washing tub by setting the inner rotor to any one of a free-wheeling mode, an intermittent driving mode, and a low power driving mode; and driving the outer rotor in one direction opposing the first direction to thus reversely rotate the pulsator.

According to a third aspect of the present invention, there is provided a washing machine comprising: an outer tub that is suspended and supported inside a case; a washing tub rotatably disposed inside the outer tub to thus perform washing and dehydrating; a pulsator rotatably disposed within the washing tub to thus form a wash water stream; and a driving apparatus that is mounted in a lower portion of the outer tub and drives the washing tub and the pulsator at the same time or alternatively, wherein the driving apparatus comprises: a stator that is fixed to a lower surface of an outer tub and on an inner side and an outer side of which a first coil and a second coil are provided, respectively; an inner rotor that is disposed with a gap on an inner circumferential surface of the first coil of the stator and connected with a washing tub; an outer rotor that is disposed with a gap on an outer circumferential surface of the second coil of the stator and connected with a pulsator; and a control unit that applies a first drive signal and a second drive signal independently to the first coil and the second coil, wherein when the control unit drives the pulsator and the washing tub in the opposite directions, the control unit drives the inner rotor and the outer rotor in a first direction where the washing tub is rotated, to then set the inner rotor to any one of a free-wheeling mode, an intermittent driving mode, and a low power driving mode, to thus rotate the washing tub, and drives the outer rotor in one direction opposing the first direction to thus reversely rotate the pulsator.

As described above, the present invention may respectively selectively drive an inner rotor and an outer rotor of a motor for a washing machine including double rotors without using a separate clutch, to thus realize a variety of washing methods.

For example, various washing methods may be implemented as follows: a first method of forming a soft water stream by rotating a pulsator and a washing tub in an identical direction and at an identical speed; a second method of forming a water stream of vortex by rotating the pulsator and the washing tub in an identical direction and at different speeds; a third method of forming a strong water stream of high cleaning capability by rotating the pulsator and the washing tub in different directions and at an identical speed; a fourth method of forming a strong water stream of various patterns by rotating the pulsator and the washing tub in different directions and at different speeds; a fifth method of forming a strong water stream and a rhythmic water stream by sharply varying rotating speeds of the pulsator and the washing tub; a sixth method of forming a soft rhythmic water stream by slowly varying rotating speeds of the pulsator and the washing tub; and a seventh method of operating a circuit of a small capacity on a power-saving basis by starting the pulsator and the washing tub with a time difference, when compared with a case of starting the pulsator and the washing tub simultaneously.

In particular, as shown in the third and fourth methods, in the case of reversely rotating the washing tub in an opposite direction to the rotational direction of the pulsator in order to form a strong water stream to increase cleaning capability at a washing mode and a rinsing mode, it is necessary to drive the inner rotor and the outer rotor in mutually opposite directions.

In this case, it is necessary to prevent interference between loads moving in the mutually opposite directions, and to prevent excessive current consumption from occurring at an initial starting time due to high starting torque of the washing tub of a large load.

In the present invention, the pulsator requiring a small starting torque as a small load is reversely rotated, in a state where the pulsator and the washing tub are rotated in one direction, by sequentially driving the outer rotor and the inner rotor at the same time or at time intervals, in one direction to which the washing tub is intended to rotate, in order to avoid interference between loads of the pulsator and the washing tub connected to the outer rotor and the inner rotor, and thus the washing tub is rotated by an inertial force at the time of blocking driving of the inner rotor or at the time of a low power driving mode, thereby minimizing energy consumption and obtaining a mutually opposite direction driving effect by a dual power drive.

In the present invention, a motor driving apparatus for a washing machine using a double rotor motor may prevent an initial starting current from being excessively consumed due to a lack of the starting torque of the inner rotor at the time of initially starting the washing tub with the inner rotor, to thus prevent efficiency from lowering, that is, to prevent performance degradation.

In addition, in the present invention, the starting current consumption of the inner rotor of small starting torque is reduced by rotating the inner rotor in a state where stop inertia of the washing tub is broken by rotationally driving the outer rotor of large starting torque in one direction to which the inner rotor is intended to rotate, to thus prevent efficiency from lowering, that is, to prevent performance degradation.

Furthermore, in the present invention, when forming a strong water stream to increase cleaning capability by rotating the pulsator and washing tub in mutually opposite directions, the starting current consumption of the inner rotor of small starting torque is reduced to thus prevent efficiency from lowering, that is, to prevent performance degradation.

In the present invention, the outer rotor of large starting torque may reach a preset speed quickly by rotating the outer rotor of large starting torque in a desired direction earlier than or simultaneously with the inner rotor of small starting torque, to thus enable a strong water stream control in accordance with rapid acceleration.

The present invention may prevent excessive current consumption at an initial starting time due to insufficient torque of the inner rotor as a result that current consumption is increased due to interference between loads moving in the mutually opposite directions when the inner rotor and the outer rotor are driven in the mutually opposite directions in the double rotor motor, to thus prevent efficiency from lowering, that is, to prevent performance degradation.

In the present invention, the washing tub may be driven at an intermittent driving mode or a low power driving mode in one direction opposite to the rotational direction of the pulsator at a washing mode and a rinsing mode and thus may be reversely rotated, to thereby form a strong water stream that increases cleaning capability.

In the present invention, the washing tub may be reversely rotated in a freewheeling state in one direction opposite to the rotational direction of the pulsator at a washing mode and a rinsing mode, to thus generate an eddy current (or vortex), to thereby form a water stream of high cleaning capability.

DETAILED DESCRIPTION OF THE INVENTION

Figure 1:
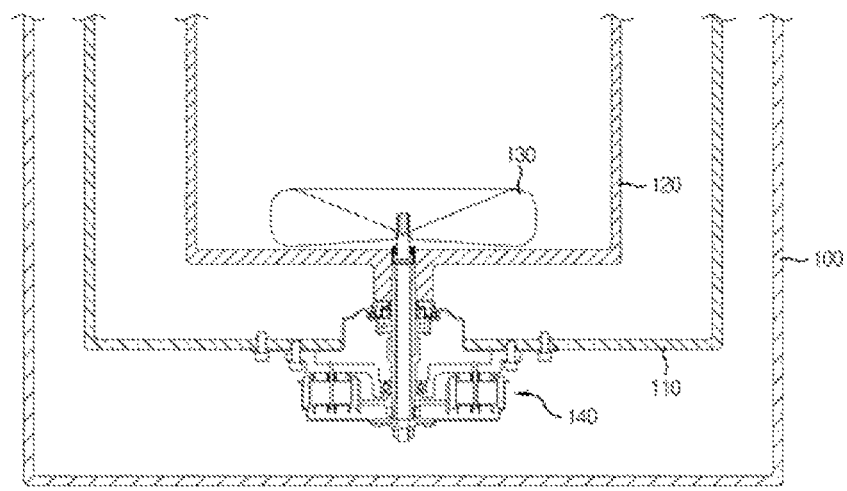
FIG. 1 is a sectional view of a full-automatic washing machine according to an embodiment of the present invention.

Hereinafter, embodiments of the present invention will be described in detail with reference to the accompanying drawings. In the process, the size and shape of the components illustrated in the drawings may be shown exaggerated for convenience and clarity of explanation. Further, by considering the configuration and operation of the present invention the specifically defined terms may be changed according to user's or operator's intention, or the custom. Definitions of these terms herein need to be made based on the contents across the whole application.

First, a full-automatic washing machine and a washing machine motor of a double-rotor structure to which the present invention is applied will be described in detail before explaining a motor driving apparatus for a washing machine.

Figure 2:
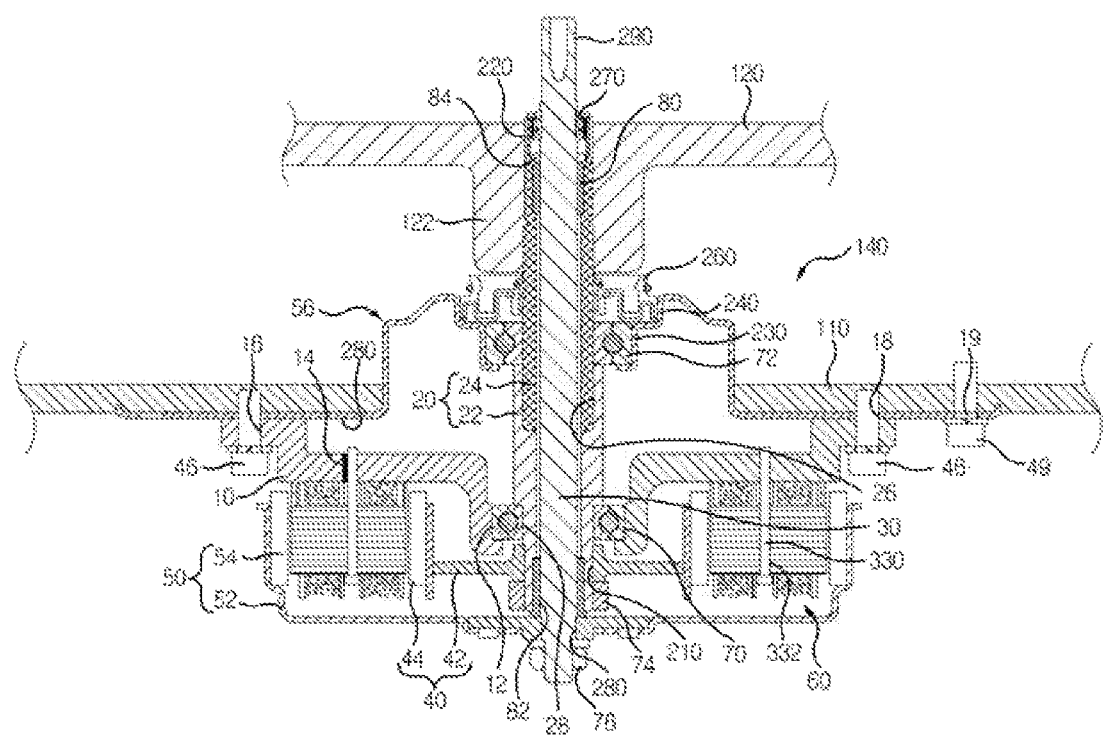
FIG. 2 is a cross-sectional view of a washing machine driving apparatus according to an embodiment of the present invention.

Referring to FIGS. 1 and 2, the washing machine includes: a case 100 forming an outer appearance; an outer tub 110 which is suspended and supported in an inside of the case 100 for receiving washing water; a washing tub 120 which is rotatably disposed inside the outer tub 110 to perform washing and dehydrating; a pulsator 130 which is rotatably disposed inside the washing tub 120 to form a washing water stream; and a driving apparatus 140 which is mounted on a lower portion of the washing tub 120, to drive the washing tub 120 and the pulsator 130 simultaneously or selectively.

As shown in FIG. 2, the driving apparatus 140 includes: an outer shaft 20 one end of which is connected with the washing tub 120; an inner shaft 30 which is rotatably arranged inside the outer shaft 20 and one end of which is connected with the pulsator 130; an inner rotor 40 which is connected with the other end of the outer shaft 20; an outer rotor 50 which is connected with the other end of the inner shaft 30; and a stator 60 which is disposed with an air gap between the inner rotor 40 and the outer rotor 50.

A first bearing 70 and a second bearing 72 which rotatably support the outer shaft 20 are disposed at a predetermined interval on an outer circumferential surface of the outer shaft 20.

The first bearing 70 is supported on a first bearing housing 10, and the second bearing 72 is supported on a second bearing housing 56. The first bearing housing 10 and the second bearing housing 56 are fixed to the outer tub 110.

Figure 3:
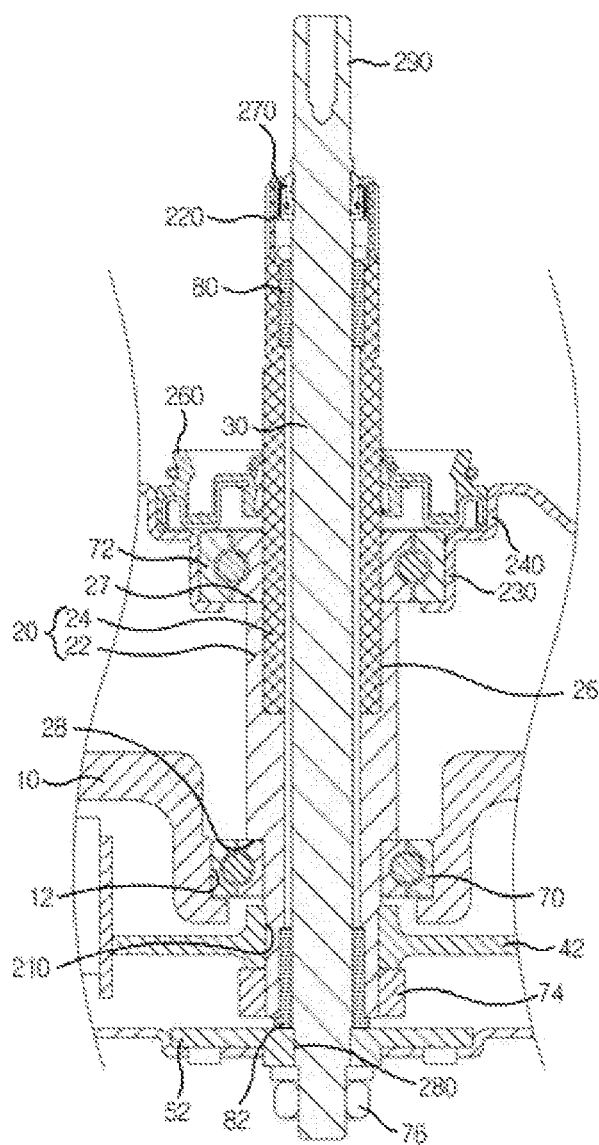
FIG. 3 is a longitudinal sectional view of an inner shaft and an outer shaft in accordance with an embodiment of the present invention.

As shown in FIG. 3, the outer shaft 20 is configured in a cylindrical form so that the inner shaft 30 passes through the outer shaft 20, and includes: a first shaft 22 coupled to the inner rotor 40; and a second shaft 24 connected to an upper side of the first shaft 22 and coupled to the washing tub 120.

A press-fit groove 26 into which a lower end of the second shaft 24 is press-fitted is formed on the inside of an upper end of the first shaft 22, and a stepped portion 28 whose outer diameter becomes small is formed on an outer circumferential surface of an intermediate side of the first shaft 22, in which the first bearing 70 is mounted on the stepped portion 28 to thus prevent the first bearing 70 from moving up and down.

In addition, a first connecting portion 210 on which an inner rotor housing 42 of the inner rotor 40 is fixed is formed at a lower side of a portion where the first bearing 70 of the first shaft 22 is mounted, and a first fixing nut 74 which makes the inner rotor housing 42 fixed to the first shaft 22 is fastened at the lower side of the first connecting portion 210.

Here, the first bearing 70 is inserted into the stepped portion 28 formed on the outer circumferential surface of the first shaft 22, the inner rotor housing 42 is connected to the first connecting portion 210, and a first tightening nut 74 is coupled with the first connecting portion 210, to thereby complete an assembly conveniently. In addition, since the first bearing 70 is inserted into the stepped portion 28, the first bearing 70 is prevented from moving and the inner rotor housing 42 is prevented from being separated from the first shaft 22 by the first tightening nut 74.

The lower end of the second shaft 24 is press-fitted into the press-fit groove 26 of the first shaft 22 and is connected to the first shaft 22, the second bearing 72 is inserted into an outer circumferential surface thereof, and a second connecting portion 220 connected to a coupling portion 122 formed at the center of the washing tub 120 is formed on an outer circumferential surface of an upper portion of a portion into which the second bearing 72 is inserted.

The first connecting portion 210 and the second connecting portion 220 may be coupled in a spline coupling structure through a serration formed on the outer surface of the first shaft 22, or may be coupled in a mutual key coupling structure through a key groove formed on the outer surface of the first shaft 22.

The first connecting portion 210 and the second connecting portion 220 may be coupled by employing any structure which may connect the inner rotor housing 42 and the washing tub 120, on the outer surface of the first shaft 22, in addition to the above-described coupling methods.

The inner shaft 30 is rotatably disposed on an inner surface of the outer shaft 20, and the lower end of the inner shaft 30 is extended out from the lower end of the outer shaft 20. A third connecting portion 280 to which the outer rotor housing 52 is connected is formed at the lower end of the inner shaft 30. A second tightening nut 76 which prevents the outer rotor housing 52 from seceding from the third connecting portion 280 is coupled on the lower end of the inner shaft 30. Then, the top of the inner shaft 30 is extended from the top of the outer shaft 20 in which a fourth connecting portion 290 to which the pulsator 130 is connected is formed at the upper end of the inner shaft 30.

Here, the third connecting portion 280 and the fourth connecting portion 290 have a structure in which the third connecting portion 280 and the fourth connecting portion 290 may be coupled in a spline coupling structure through serration formed on the outer surface of the inner shaft 30, the outer rotor housing 52 and the pulsator 130, or may be coupled in a mutual key coupling structure through key grooves formed on the outer surface of the inner shaft 30, the outer rotor housing 52 and the pulsator 130.

A first sleeve bearing 80 and a second sleeve bearing 82 are secured on the upper-inner circumferential surface and the lower-inner circumferential surface of the outer shaft 20. The inner shaft 30 is rotatably supported on the first sleeve bearing 80 and the second sleeve bearing 82.

In addition, a secession prevention ring 84 is coupled on the upper-outer circumferential surface of the inner shaft 30 and the secession prevention ring 84 prevents secession of the first sleeve bearing 80.

The first bearing housing 10 includes: a bearing mounting portion 12 which is made of a resin material and formed by a mold, on an inner surface of which a first bearing is mounted; a first coupling hole 14 to which a stator 60 is fixed at certain intervals in a circumferential direction in a central side of the first bearing housing 10; and second coupling holes 16 which are formed so that the first bearing housing 10 is coupled on the outer tub 110 with bolts 46 at certain intervals in a circumferential direction in an outer edge of the first bearing housing 10.

A second bearing housing 56 is formed of a metal material, and includes: a bearing mounting portion 230 which is formed at the central opening portion in which the second bearing 72 is mounted; a seal mounting portion 240 which is bent in an upward direction from the bearing mounting portion 230 in which a first seal 260 is mounted; and an outer tub fixing portion 250 which is bent in a downward direction from the seal mounting portion 240, in which third coupling holes 18 are formed so that the second bearing housing 56 is coupled on the outer tub 110 with the bolts 46.

In addition, a fourth coupling hole 19 is further formed to the outside of the third coupling hole 18 of the second bearing housing 56, and the second bearing housing 56 may be secured on the outer tub 110 more firmly so as to be coupled on the outer tub 110 through the fourth coupling hole 19 with a bolt 49.

Here, an opening is formed in the center of the outer tub 110, the second bearing housing 56 passes through the opening of the outer tub 110 and comes in contact with the rear surface of the outer tub 110, and the first bearing housing 10 is stacked on the second bearing housing 56 to then be coupled on the outer tub 110 by the bolts 46.

In other words, the first bearing housing 10 and the second bearing housing 56 are arranged to be laminated on the rear surface of the outer tub 110, the bolts 46 are passed through the second coupling holes 16 of the first bearing housing 10 and the third coupling holes 18 of the second bearing housing 56, respectively, to then be coupled with the outer tub 110. Accordingly, the first bearing housing 10 and the second bearing housing 56 may be coupled with the outer tub 110 with the bolts 46 simultaneously, to thus improve the assembling property.

The first seal 260 is mounted between the second bearing housing 56 and the outer surface of the outer shaft 20 to prevent the washing water from leaking, and a second seal 270 is mounted between the upper-inner surface of the outer shaft 20 and the upper-outer surface of the inner shaft 30, to prevent the washing water from leaking.

The driving apparatus shown in FIG. 2, the inner rotor 40 includes: the inner rotor housing 42; and a first magnet 44 fixed on the outer surface of the inner rotor housing 42. The inner rotor housing 42 is formed of a disc shape with a central opening portion, in which the first magnet 44 is fixed on the outer surface of the inner rotor housing 42 and the first connecting portion 210 of the outer shaft 20 is connected to the inner surface of the inner rotor housing 42.

In addition, the outer rotor 50 includes: the outer rotor housing 52 and a second magnet 54 which is fixed on the inner surface of the outer side of the outer rotor housing 52 and is disposed at a predetermined gap while facing the outer surface 54 of the stator 60. The second magnet 54 is fixed to the inner surface of the outer side of the outer rotor housing 52 and the inner surface of the outer rotor housing 52 is connected to the third connecting portion 280 of the inner shaft 30.

Here, the inner rotor housing 42 and the rotor outer housing 52 are preferably formed of a magnetic passage forming material for forming a magnetic passage with no back yoke. Of course, the inner rotor housing 42 and the outer rotor housing 52 may be formed of a thermosetting resin, such as BMC (Bulk Molding Compound), while using a back yoke.

Figure 4:
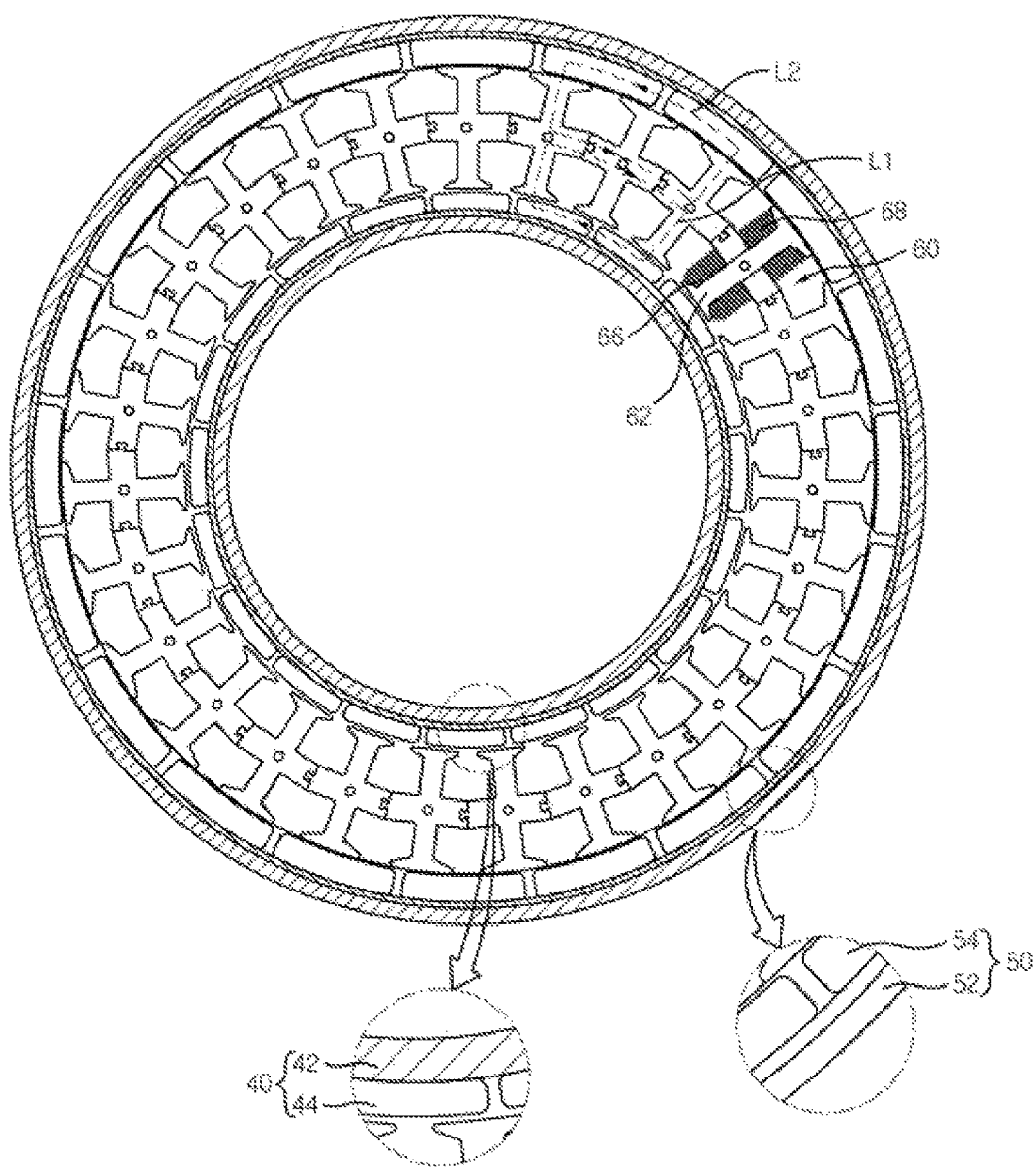
FIG. 4 is a radially cross-sectional view of a washing machine driving apparatus according to an embodiment of the present invention.
Figure 5:
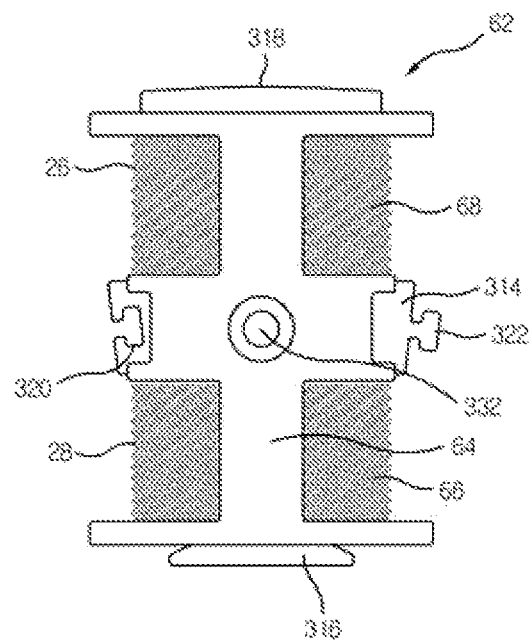
FIG. 5 is a plan view of a split stator according to an embodiment of the present invention.
Figure 6:
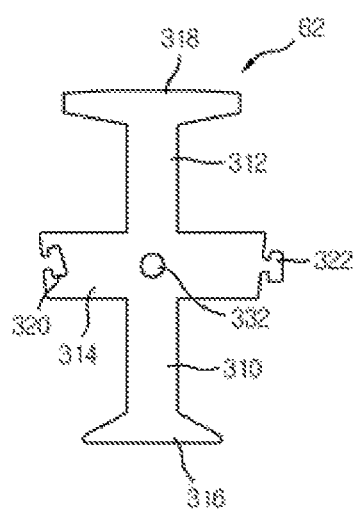
FIG. 6 is a plan view of a split stator core in accordance with an embodiment of the present invention.
Figure 7:
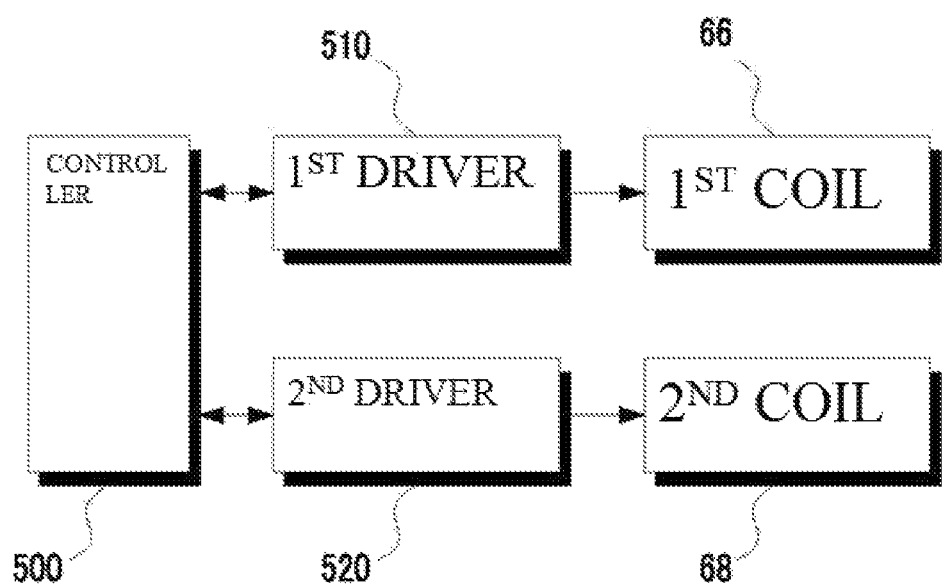
FIG. 7 is a block diagram showing a control unit of a full-automatic washing machine according to an embodiment of the present invention.

Referring to FIGS. 4 to 6, the stator 60 includes: a plurality of split stator cores 62 which are radially arranged; bobbins 64 made of a non-magnetic material, and surrounded on the outer circumferential surfaces of the split stator cores 62; a first coil 66 wound on one side of the split stator cores 62; and a second coil 68 wound on the other side of the split stator cores 62.

Here, a first drive signal is applied to the first coil 66, and a second drive signal is applied to a second coil 68. Thus, when the first drive signal is applied to only the first coil 66, only the inner rotor 40 is rotated, when the second drive signal is applied to only the second coil 68, only the outer rotor 50 is rotated, and when the first drive signal and the second drive signal are simultaneously applied to the first coil 66 and the second coil 68, respectively, the inner rotor 40 and the outer rotor 50 are rotated simultaneously.

Each of the split stator cores 62 includes: a first tooth portion 310 on which the first coil 66 is wound; a second tooth portion 312 which is formed on the other side of the first tooth portion 310 and on which the second coil 68 is wound; a partitioning portion 314 for dividing between the first and second tooth portions 310 and 312; and coupling units 320 and 322 which are formed at both side ends on the partitioning portion 314 and which mutually connect between the split stator cores 62.

The first coil 66 is preferably wound in a three-phase winding structure on the first tooth portion 310 and the second coil 68 is preferably wound in a three-phase winding structure on the second tooth portion 312.

A first flange portion 316 which is arranged to face the first magnet 44 is formed at the end of the first tooth portion 310, and a second flange portion 318 which is arranged to face the second magnet 54 is formed at the end of the second tooth portion 312.

The first flange portion 316 and the second flange portion 318 are respectively configured to form inwardly and outwardly curved surfaces at a predetermined curvature to correspond to the first magnet 44 of the inner rotor 40 and the second magnet 54 of the outer rotor 50. Thus, roundness of the inner and outer circumferential surfaces of the split stator core 62 increases, and thus the inner and outer circumferential surfaces of the stator are close to the first magnet 44 and the second magnet 54, respectively, but a predetermined magnetic gap may be maintained.

Then, a throughhole 332 through which a fixing bolt 330 passes is formed at the center of the split stator core 62, that is, the partitioning section 314.

Here, the fixing bolt 330 passes through the throughhole 332 and is coupled with the first coupling holes 14 formed in the first bearing housing 10, which plays a role of securing the split stator core 62 on the first bearing housing 10.

In other words, after having arranged the stator cores 62 in the circumferential direction on the first bearing housing 10, and then having made the fixing bolt 330 pass through the throughhole 332 formed on each of the stator cores 62, so as to be coupled with the first coupling hole 14 formed in the first bearing housing 10, the stator cores 62 can be arranged and fixed in an annular form.

Thus, the stator cores 62 are arranged at a predetermined interval in the circumferential direction on the first bearing housing 10, and then coupled by the fixing bolt 330, to thereby complete the assembly. The first bearing housing 10 is coupled and fixed on the outer tub 110 with the bolt 48 and thus parts and an assembly process of arranging the conventional stator cores in an annular form and parts and an assembly process of fixing the stator are unnecessary, to thus reduce the assembly process and the number of parts.

As described above, a coupling structure between the split stator cores 62 and the first bearing housing 10 may be integrally formed by insert molding the split stator cores 62, other than the structure which is coupled by the fixing bolt 330, when the first bearing housing 10 is prepared by molding a thermosetting resin, e.g. a BMC (Bulk Molding Compound) molding material.

The plurality of the split stator cores 62 have a structure that the split stator cores 62 are directly connected to each other, so as to form a magnetic circuit between the split stator cores 62. Thus, the coupling portions 320 and 322 have a structure that the coupling portions 320 and 322 are directly connected between the split stator cores 62 so that the split stator cores 62 may be energized each other.

As an example, these coupling portions 320 and 322 are configured so that a coupling protrusion 322 is protrudingly formed at one side of the partitioning portion 314 and a coupling groove 320 with which the coupling protrusion 322 is fitted and coupled is formed at the other side of the partitioning portion 314. Thus, when the coupling protrusion 322 is fitted into and coupled with the coupling groove 320, the split stator cores 62 are radially arranged, and have a directly cross-linked structure that the split stator cores 62 are directly connected with each other.

A bobbin 64 is configured so that a first flange portion 316 and a second flange portion 318 surround the outer circumferential surface of the other stator cores 62 in order to make the first flange portion 316 and the second flange portion 318 of one split stator core 62 are exposed to mutually act with a first magnet 44 and a second magnet 54. In other words, the bobbin 64 is formed on the outer circumference of the split stator core 62 by an insert molding method, and insulates between the split stator core 62 and both the first coil 66 and the second coil 68.

The stator 60 according to an embodiment of the present invention may be configured so that the first tooth portion 310 on which the first coil 66 is wound forms an inner stator, and the second tooth 312 formed on the other side of the first tooth portion 310, and on which the second coil 68 is wound forms an outer stator, to thereby constitute a double stator.

The driving apparatus according to an embodiment of the present invention forms a first magnetic circuit L1 between the inner rotor 40 and one side of the stator 60 where the first coil 66 is wound, and forms a second magnetic circuit L2 between the outer rotor 50 and the other side of the stator 60 where the second coil 68 is wound, to thus form a pair of magnetic circuits each independent to each other. As a result, the inner rotor 40 and the outer rotor 50 may be respectively driven separately.

More specifically, the first magnetic circuit L1 includes the first magnet 44 of an N-pole, the first tooth portion 310 on which the first coil 66 is wound, an inner part of the partitioning portion 314, the first magnet 44 of an S-pole adjacent to the first magnet 44 of the N-pole, and the inner rotor housing 42.

In addition, the second magnetic circuit L2 includes the second magnet 54 of an N-pole, the second tooth portion 312 facing the second magnet 54 of the N-pole and on which the second coil 68 is wound, an outer part of the partitioning portion 314, the second magnet 54 of an S-pole, and the outer rotor housing 52.

A driving method of the full-automatic washing machine according to an embodiment of the present invention as constructed above will be described below with reference to FIGS. 7 to 12.

The full-automatic washing machine is provided with a control unit for applying drive signals to the first coil 66 and the second coil 68 independently of each other.

The control unit includes: a first driver 510 for generating a first drive signal applied to the first coil 66; a second driver 520 for generating a second drive signal applied to the second coil 68; and a controller 500 for controlling the overall washing machine as well as the first driver 510 and the second driver 520.

The first driver 510 and second driver 520 includes an inverter, respectively. The first driver 510 and the second driver 520 are respectively configured to selectively turn on one of three pairs of upper switching elements and one of three pairs of lower switching elements that are provided in each of the inverters based on, for example, a general 6-step scheme, to thereby generate U-phase, V-phase and W-phase alternating-current (AC) power, and to change phases of three-phase AC power applied to the first coil 66 and the second coil 68 of a three-phase structure while changing the generated U-phase, V-phase and W-phase AC power, to thereby rotationally drive the pulsator 130 and the washing tub 120.

The full-automatic washing machine according to an embodiment of the present invention is configured to independently drive the pulsator 130 and the washing tub 120, to thus control the rotation directions and the rotation speeds of the pulsator 130 and the washing tub 120, to thereby form various water streams.

Figure 8:
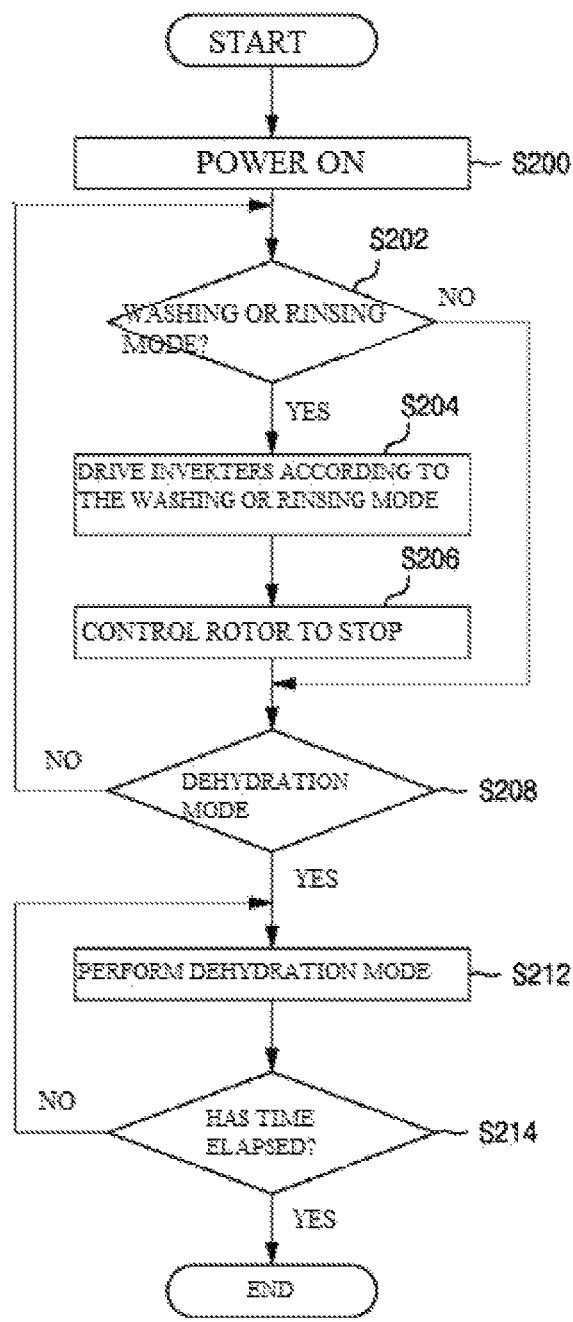
FIG. 8 is a flowchart showing a control method of a full-automatic washing machine according to an embodiment of the present invention.

Referring to FIG. 8, the fully-automatic washing machine according to an embodiment of the present invention is first turned on (S200).

In such a state the controller 500 determines whether to perform a washing or rinsing mode, through a washing current control signal input according to user's selection (S202).

In the determination result, when it is determined that the washing or rinsing mode is performed, the controller 500 drives the inverters of the first driver 510 and the second driver 520 in accordance with the washing or rinsing mode (S204).

Then, the first driver 510 and the second driver 520 generate the three-phase AC power, to thus apply the generated three-phase AC power to the first coil 66 and the second coil 68 of the stator 60 selectively and independently. Therefore, the pulsator 130 and the washing tub 120 are driven in any one scheme to form various water streams for washing.

That is, the inner rotor 40 and the outer rotor 50 in the washing machine motor with the double rotor may be selectively driven to thus implement a variety of washing methods.

Then, in a state in which all the rotors stop (S206), the controller 500 determines whether or not a dehydration mode is currently performed or determines whether to perform the dehydration mode (S208) in the case that a current mode is not the washing or rinsing mode (S202).

In the determination result, when it is determined that the rinsing mode is performed, the controller 500 controls the first driver 510 and the second driver 520 so that the inner rotor 40 and the outer rotor 50 are rotated in an identical direction, to thus apply an identical drive signal to the first coil 66 and the second coil 68. Therefore, the pulsator 130 and the washing tub 120 are rotated in an identical direction to thus perform an operation at the dehydrating mode (S212).

In addition, the controller 500 determines whether an execution time of the dehydration mode has elapsed (S214), and terminates the washing operation of the laundry, if the execution time of the dehydrating mode has passed.

The washing or rinsing mode described according to the embodiment of the present invention will be described further as follows.

First, when only the pulsator 130 is driven, the second drive signal is applied to the second coil 68 by the second driver 520. Then, as the outer rotor 50 is rotated by the second magnetic circuit L2, the inner shaft 30 connected with the outer rotor 50 is rotated to thus rotate the pulsator 130.

In this way, when only the pulsator 130 is driven, rising and falling rotating water streams may be formed and may be used mainly in a general washing mode.

Then, when only the washing tub 120 is driven, the first driving signal is applied to the first coil 66 by the first driver 510. Then, as the inner rotor 40 is rotated by the first magnetic circuit L1, the outer shaft 20 connected to the inner rotor 40 is rotated to thus rotate the washing tub 120.

In this way, when only the washing tub 120 is driven, a fabric tangling preventive water stream may be formed. That is, when it is determined that the fabric has got entangled, the controller 500 controls the first driver 510, to thus rotate only the washing tub 120.

In addition, when the pulsator 130 and the washing tub 120 are rotated in an identical direction and at an identical speed, the controller 500 controls the first driver 510 and the second driver 520 simultaneously, to thus apply an identical drive signal to the first coil 66 and the second coil 68. Therefore, the pulsator 130 and the washing tub 120 are rotated in an identical direction and at an identical speed.

In this way, when the pulsator 130 and the washing tub 120 are rotated in an identical direction and at an identical speed, a soft water stream may be formed and may be used in the case of requiring a delicate washing mode according to the type of laundry.

In addition, when the pulsator 130 and the washing tub 120 are rotated in an identical direction and at different speeds, the amount of current of the first drive signal may differ from that of the second drive signal, to then apply the first drive signal and the second drive signal to the first coil 66 and the second coil 68, respectively.

In this way, when the pulsator 130 and the washing tub 120 are rotated in an identical direction and at different speeds, a swirling water stream of vortex may be formed, and may be used in a washing mode required to avoid damage to the laundry.

In addition, when the pulsator 130 and the washing tub 120 are rotated in different directions and at an identical speed, the controller 500 controls the first driver 510 to apply the first drive signal to the first coil 66 in the forward direction and controls the second driver 520 to apply the second drive signal to the second coil 68 in the reverse direction, to thus drive the pulsator 130 and the washing tub 120 in different directions.

In this way, when the pulsator 130 and the washing tub 120 are rotated in different directions and at an identical speed, a strong water stream may be formed to thus improve cleaning capability, and may be used in a washing mode requiring strong cleaning capability.

In addition, when the pulsator 130 and the washing tub 120 are rotated in different directions and at different speeds, the controller 500 controls the first driver 510 and the second driver 520 to apply the first drive signal and the second drive signal to the first coil 66 and the second coil 68, respectively, in which the amount of current and the direction of current of the first drive signal differ from those of the second drive signal.

In this way, when the pulsator 130 and the washing tub 120 are rotated in different directions and at different speeds, strong water streams may be formed in a number of patterns to thus implement a variety of washing modes.

In addition, in the case of varying rotational speeds of the pulsator 130 and the washing tub 120, the controller 500 controls the first driver 510 and the second driver 520 thereby varying the amount of current of the first drive signal and the second drive signal.

In this way, in the case of varying rotational speeds of the pulsator 130 and the washing tub 120, a rhythmic water stream may be formed to thus implement the rhythmic laundry. That is, when the rotational speeds of the pulsator 130 and the washing tub 120 are controlled to vary rapidly, a strong water stream and a rhythmic water stream may be formed to thus prevent damage to the laundry. Further, when the rotational speeds of the pulsator 130 and the washing tub 120 are controlled to vary slowly, a smooth rhythmic water stream may be formed to thus prevent damage to the laundry.

In addition, in the case of starting the pulsator 130 and the washing tub 120, with a time difference, one of the pulsator 130 and the washing tub 120 is driven and then the other thereof is driven with a predetermined time difference. In the case of starting the pulsator 130 and the washing tub 120 with a time difference, circuits of less capacity may be needed in comparison with the case of starting the pulsator 130 and the washing tub 120 simultaneously.

Meanwhile, in the case of rotating the washing tub 120 in the opposite direction to the rotational direction of the pulsator 130, in order to form a strong water stream that increases cleaning capability at the time of washing and rinsing modes, it is necessary to drive the inner rotor 40 and the outer rotor 50 in opposite directions to each other.

In this case, it is necessary to prevent excessive current consumption at an initial start time due to loads of the inner rotor 40 and the outer rotor 50, that is, interference between the pulsator 130 and the washing tub 120 and a high start torque of the washing tub 120 having a large load.

Referring to FIGS. 9 to 12, a method of driving the pulsator and the washing tub so as to be reversely rotated according to first to fourth embodiments of the present invention will be described below.

The reverse rotation driving of the pulsator and the washing tub is used to form a strong water stream to increase cleaning capability at the time of performing the washing and rinsing modes.

Figure 9:
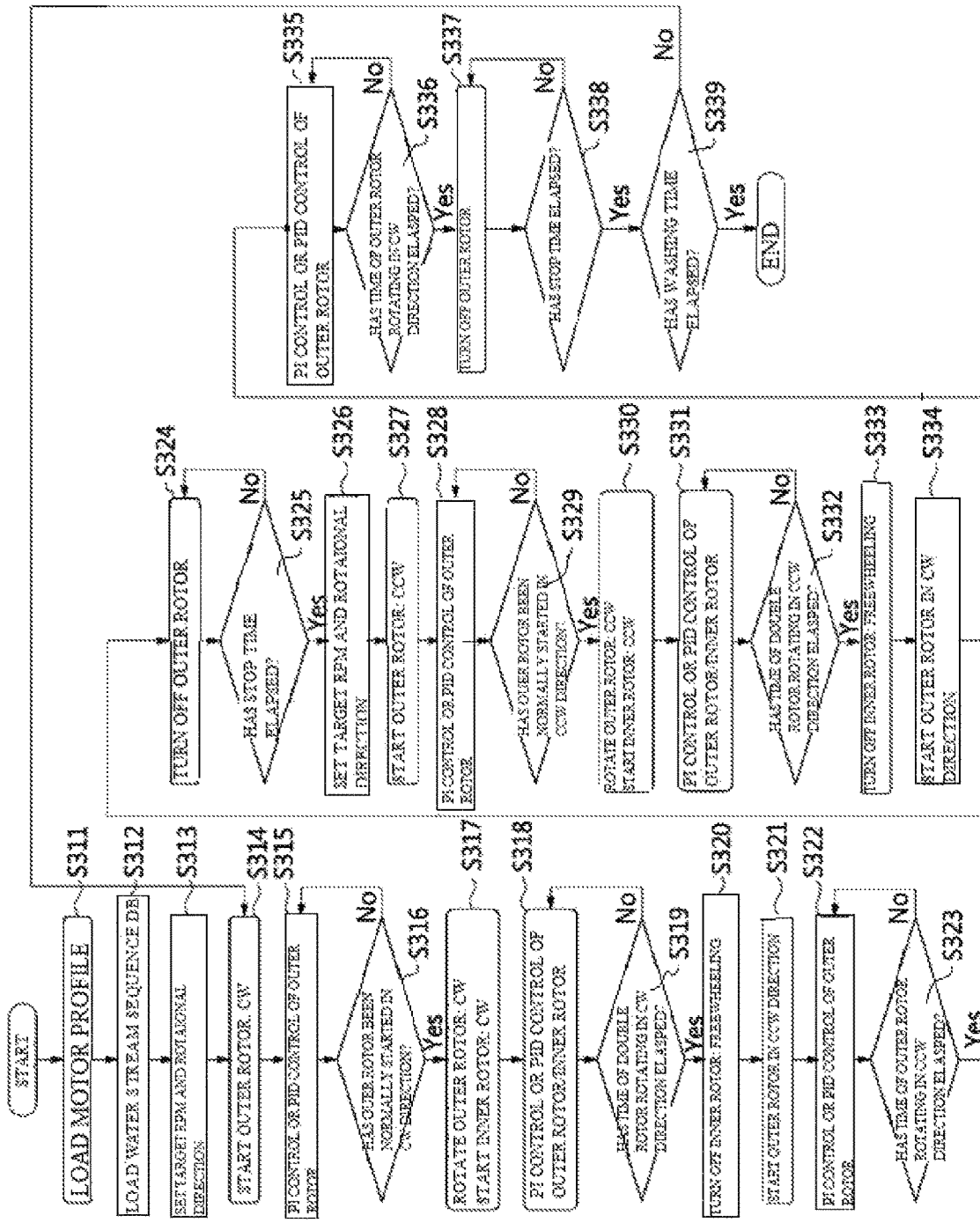
FIGS. 9 to 12 are flowcharts illustrating washing methods of a reversely rotating system according to first to fourth embodiments of the present invention.

Referring to FIG. 9, in a reverse rotation driving method of the pulsator and the washing tub according to the first embodiment of the present invention, the controller 500 starts first to load a motor profile necessary for driving a corresponding motor for respective motors having different characteristics from a database (DB) stored in a memory device (not shown) (S311).

Thereafter, a water stream sequence according to laundry and a washing course selected by a user is determined and data corresponding to the determined water stream sequence is loaded from a water stream sequence DB (S312). That is, the water stream sequence is to define a washing course formed by rotationally driving the inner rotor 40 and the outer rotor 50 as will be described later, and is data indicating a sequence, a driving frequency, a driving time, a stop time, etc., of each of the inner rotor 40 and the outer rotor 50, by a time series, in order to drive the inner rotor 40 and the outer rotor 50 in the clockwise (CW) direction and in the counterclockwise (CCW) direction.

Then, target round per minutes (RPMs) and directions of rotation of the inner rotor 40 and the outer rotor 50 are set (S313).

In the reverse rotation driving method of the pulsator and the washing tub according to the first embodiment of the present invention, the outer rotor 50 is first started in the CW direction (S314), and then a Proportional-Integral (PI) control or a Proportional Integral and Derivative (PID) control is performed so that the rotational speed of the outer rotor 50 reaches a preset RPM (S315).

Then, it is determined that the CW driving of the outer rotor 50 has been started normally (S316). That is, it is determined whether the driving of the outer rotor 50 has been started normally by using any one method of the following methods or a method of having a combination of at least two methods thereof: a first method of determining whether a RPM of the outer rotor 50 has reached a preset value; a second method of determining whether a rotor position detection signal is received from a Hall sensor to the controller 500 consistently in order to detect the rotational position of the rotor; a third method of determining whether an amount of current of the second drive signal applied to the second coil 68 has reached a preset value; and a fourth method of determining whether a drive has been performed for a preset time by using a timer. The method of determining whether a drive has been performed for a preset time by using a timer is the simplest control method in order to determine whether the driving of the outer rotor 50 has been started normally.

In the case that it is determined that the CW driving of the outer rotor 50 has been started normally (S316), the inner rotor 40 is started in the CW direction (S317) in a state where the CW driving of the outer rotor 50 has been started normally.

As described above, starting of the inner rotor 40 in the CW direction after performing the CW driving of the outer rotor 50 for a preset time is to reduce the starting current consumption of the inner rotor 40 to thus prevent a decrease in efficiency.

That is, in some embodiments, the starting current consumption of the inner rotor 40 of small starting torque may be reduced by rotating the inner rotor 40 in a state where stop inertia of the washing tub 120 that is a load of the inner rotor 40 is broken by rotationally driving the outer rotor 50 of large starting torque in one direction to which the inner rotor 40 is intended to rotate.

In addition, the outer rotor 50 of large starting torque may reach a preset rotational speed quickly by rotating the outer rotor 50 of large starting torque in a desired direction earlier than the inner rotor 40 of small starting torque, to thus enable a strong water stream control in accordance with rapid acceleration.

Then, the PI control or PID control is performed so that the rotational speeds of the outer rotor 50 and the inner rotor 40 reach a preset target RPM (S318), and the outer rotor 50 and the inner rotor 40 are driven for the set time.

It is determined whether the outer rotor 50 and inner rotor 40 that are a dual rotor (or double rotor) have been started normally (S319) by determining whether the outer rotor 50 and inner rotor 40 have been rotationally driven for a preset time.

In particular, in this case, it is necessary to determine whether the inner rotor has been started normally for a two-way driving operation of the outer rotor 50 and inner rotor 40.

It is determined whether the driving of the inner rotor 40 has been started normally by using any one method of the following methods or a method of having a combination of at least two methods thereof: a second method of determining whether a RPM of the inner rotor 40 has reached a preset value; a third method of determining whether a rotor position detection signal is received from a Hall sensor to the controller 500 consistently in order to detect the rotational position of the inner rotor; and a fourth method of determining whether an amount of current of the first drive signal applied to the first coil 66 has reached a preset value, instead of a first method of determining whether a preset time has elapsed.

In the case that it is determined that the inner rotor 40 has been started normally, the first drive signal applied to the first coil 66 from the first driver 510 is blocked so as to stop the rotation of the inner rotor 40 (S320). Accordingly, the inner rotor 40 is made in a freewheeling state due to the inertia.

Then, upon application of the second driving signal to the second coil 68 from the second driver 520, the polarity of the second driving signal is inverted and the polarity inverted second driving signal is applied to the second coil 68. Accordingly, the rotational direction of the outer rotor 50 is converted into the CCW direction from the CW direction (S321), the outer rotor 50 is PI controlled to thus increase the rotational speed of the outer rotor 50 (S322), and the outer rotor 50 is rotated in the CCW direction for a preset time.

In the case that a predetermined time passes when driving the outer rotor 50 for a preset time (S323), the controller 50 controls the second driver 520 to stop the outer rotor 50, to thus block the second drive signal applied to the second coil 68 from the second driver 520 to thereby turn off the outer rotor 50 (S324).

As described above, according to the first embodiment of the present invention, the washing tub 120 is reversely rotated in a freewheeling state in one direction opposite to the rotational direction of the pulsator 130 at the time of the washing and rinsing modes, to thus generate an eddy current to thereby minimize energy consumption and form a water stream having high cleaning capability.

Then, when a predetermined stop time has elapsed (S325), the outer rotor 50 is rotated in the CW direction, and the inner rotor 40 is rotated in the CCW direction, in opposition to the above directions. Accordingly, the washing tub 120 is reversely rotated, to thus generate an eddy current (or vortex) to thereby minimize energy consumption and form a water stream having high cleaning capability.

For this, the inner rotor 40 and the outer rotor 50 are rotationally driven in the CCW direction in the same manner as the process in step S312, to thus set a target RPM and a rotational direction (S326).

Then, the outer rotor 50 is started in the CCW direction (S327), and then a PI control or a PID control is performed so that the rotational speed of the outer rotor 50 reaches a preset RPM (S328). In order to rotate the outer rotor 50 in the CCW direction, the controller 500 inverts the polarity of the second drive signal applied to the second coil 68 from the second driver 520 and applies the polarity inverted second drive signal to the second coil 68.

Then, the subsequent processes in steps S328 through S338 are conducted, similarly to repeating the processes in steps S315 through S325, in which the processes in steps S328 through S338 differ from the processes in steps S315 through S325, in that the polarities of the first and second drive signals applied to the first and second coils 66 and 68 from the first and second drivers 510 and 520 are inverted and the polarity inverted first and second drive signals are applied to the first and second coils 66 and 68, respectively, so that the outer rotor 50 and inner rotor 40 are rotated in the CCW direction, in the processes in steps S328 through S338.

Then, it is determined whether a preset washing time has elapsed (S339). If the preset washing time has not elapsed in step S339, the process proceeds to step S314, to thus repeat the processes in steps S314 through S338.

However, if it is determined that the preset washing time has elapsed in step S339, the washing mode is finished.

As described above, according to the embodiments of the present invention, the double rotor motor is used as the driving apparatus device 140, to thus solve a problem of increasing the current consumption due to the interference between the loads moving in opposite directions to each other, that is, the pulsator 130 and the washing tub 120, when the outer rotor 50 and the inner rotor 40 are driven in opposite directions to each other.

In other words, the pulsator 130 requiring a small starting torque as a small load is reversely rotated, in a state where the pulsator 130 and the washing tub 120 are rotated in one direction, by sequentially driving the outer rotor 50 and the inner rotor 40 at time intervals, in one direction to which the washing tub 120 is intended to rotate, and thus the washing tub 120 is rotated by an inertial force even at the time of blocking driving of the inner rotor 40, thereby minimizing energy consumption and obtaining a mutually opposite direction driving effect by a dual power drive.

Figure 10:
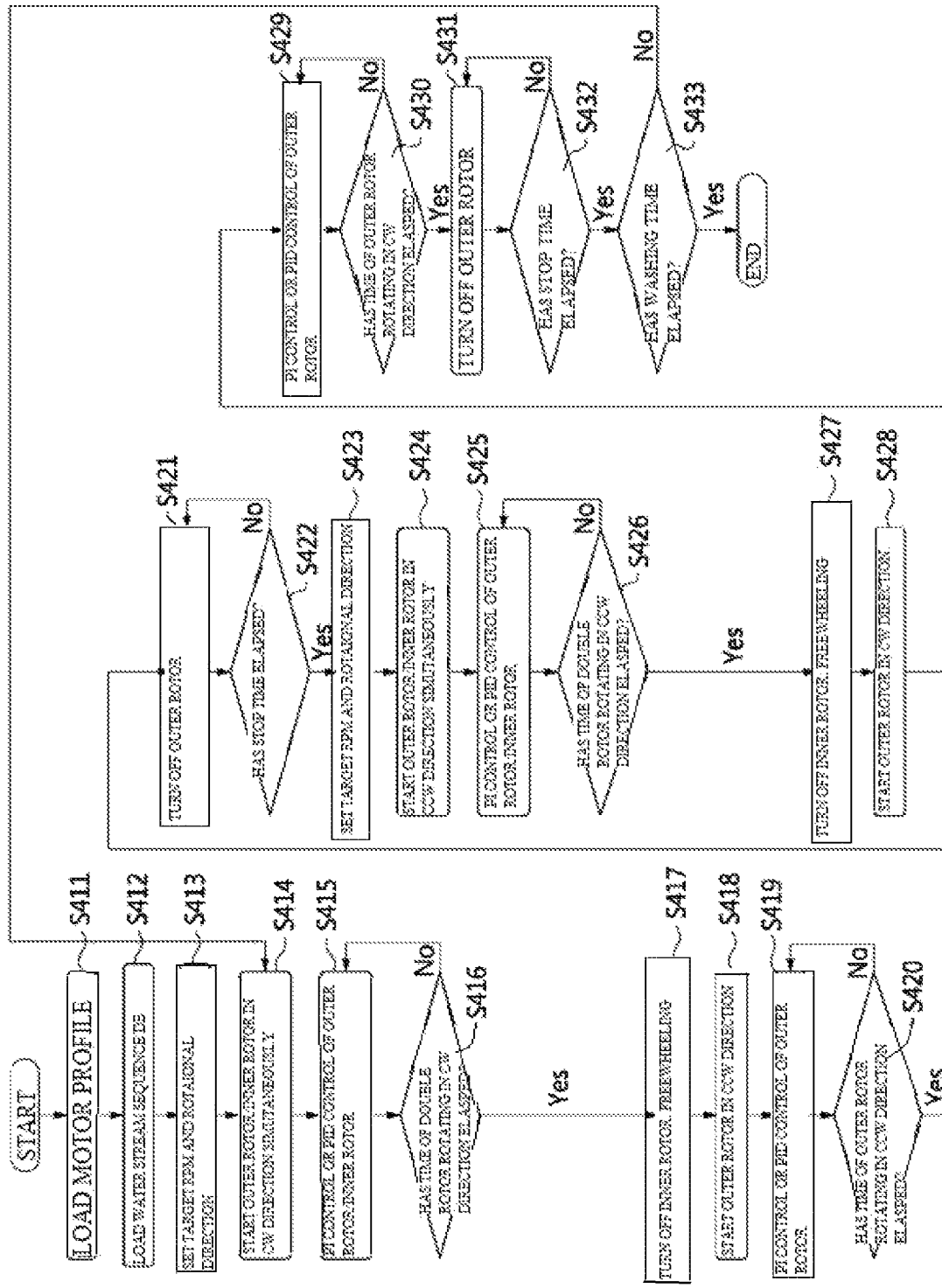

Referring to FIG. 10, a reverse rotation driving method of the pulsator and the washing tub according to the second embodiment of the present invention will be described below.

According to the first embodiment shown in FIG. 9, the direction of rotation of the outer rotor 50 is changed in a state where the pulsator 130 and the washing tub 120 are rotated in one direction, by sequentially driving the outer rotor 50 and the inner rotor 40 at the time interval, and thus the pulsator 130 is reversely rotated in the opposite direction to the rotational direction of the washing tub 120.

In the reverse rotation driving method according to the second embodiment, steps S411 through S413 of the second embodiment correspond to steps S311 through 313 of the first embodiment, steps S415 through S423 of the second embodiment correspond to steps S318 through S326 of the first embodiment, and steps S425 through S433 of the second embodiment correspond to steps S331 through S339 of the first embodiment. Thus, the second embodiment corresponding to the first embodiment will not be described.

In the second embodiment, in a state where the outer rotor 50 and the inner rotor 40 are driven simultaneously, to thus rotate the pulsator 130 and the washing tub 120 in the CW direction (S414), the rotational direction of the outer rotor 50 is changed from the CW direction to the CCW direction, to thus reversely rotate the pulsator 130 in the opposite direction to the rotational direction of the washing tub 120 (S418). In addition, in the second embodiment, in a state where the outer rotor 50 and the inner rotor 40 are driven simultaneously, to thus rotate the pulsator 130 and the washing tub 120 in the CCW direction (S424), the rotational direction of the outer rotor 50 is changed from the CCW direction to the CW direction, to thus reversely rotate the pulsator 130 in the opposite direction to the rotational direction of the washing tub 120 (S428).

As in the above-mentioned second embodiment, to simultaneously drive the outer rotor 50 and inner rotor 40 and to change the rotational direction of the outer rotor 50 to thus implement the reverse rotation driving of the pulsator 130 is applied to cases of requiring fast driving (i.e., fast starting).

Figure 11:
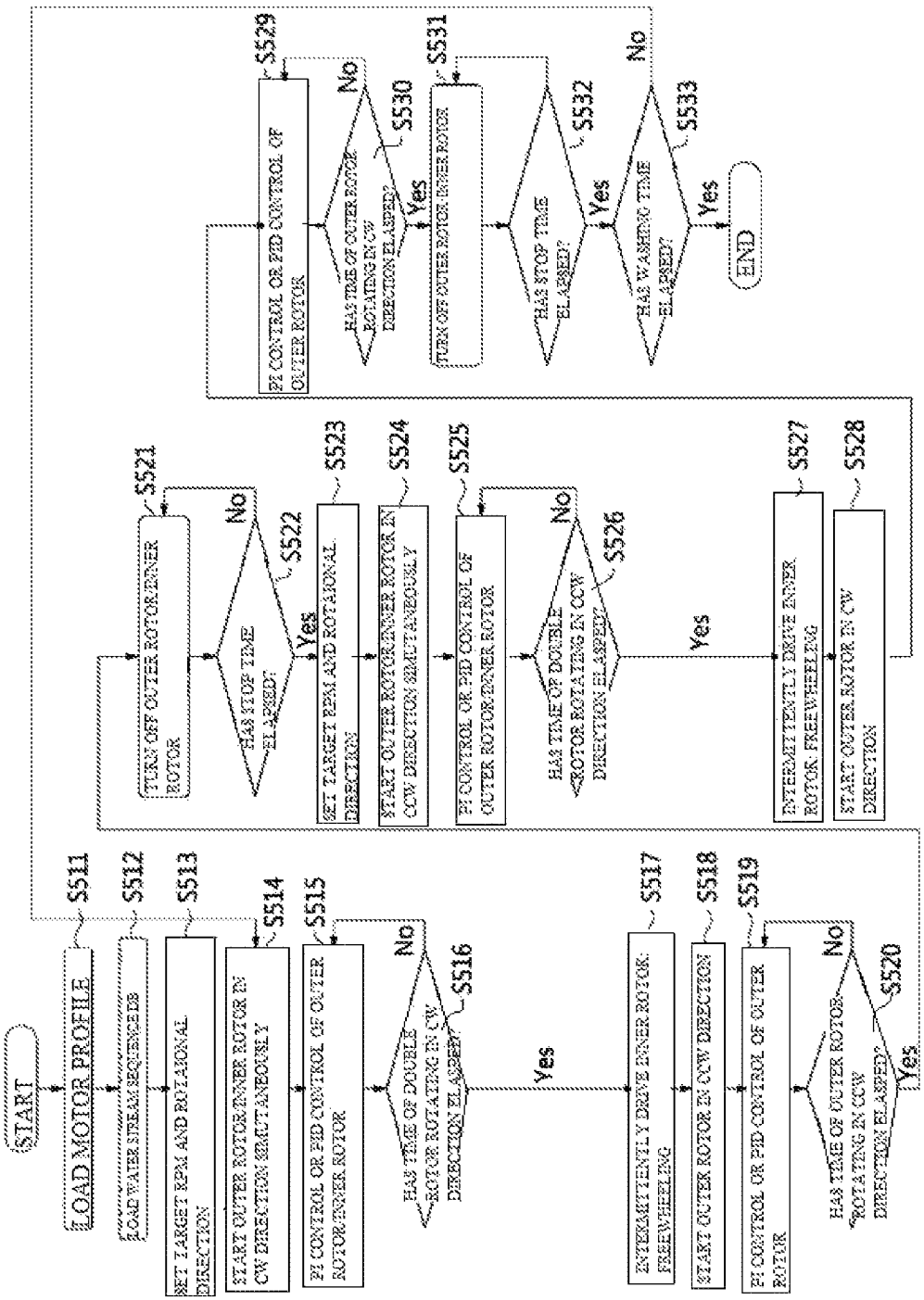

Referring to FIG. 11, a reverse rotation driving method of the pulsator and the washing tub according to the third embodiment of the present invention will be described below.

In the reverse rotation driving method according to the third embodiment, steps S511 through S516 of the third embodiment correspond to steps S411 through 416 of the second embodiment, steps S518 through S526 of the third embodiment correspond to steps S418 through S426 of the second embodiment, and steps S528 through S533 of the third embodiment correspond to steps S428 through S433 of the first embodiment. Thus, the third embodiment corresponding to the second embodiment will not be described.

In the third embodiment, in a state where the outer rotor 50 and the inner rotor 40 are driven simultaneously, to thus rotate the pulsator 130 and the washing tub 120 in the CW direction (S514), the inner rotor 40 is set in an intermittent driving and freewheeling state (S517) and the rotational direction of the outer rotor 50 is changed from the CW direction to the CCW direction, to thus reversely rotate the pulsator 130 in the opposite direction to the rotational direction of the washing tub 120 (S518). In addition, in the third embodiment, in a state where the outer rotor 50 and the inner rotor 40 are driven simultaneously, to thus rotate the pulsator 130 and the washing tub 120 in the CCW direction (S524), the inner rotor 40 is set in an intermittent driving and freewheeling state (S527) and the rotational direction of the outer rotor 50 is changed from the CCW direction to the CW direction, to thus reversely rotate the pulsator 130 in the opposite direction to the rotational direction of the washing tub 120 (S528).

As in the above-mentioned third embodiment, to simultaneously drive the outer rotor 50 and inner rotor 40 (S514), to set the inner rotor 40 in an intermittent driving and freewheeling state (S517), and to change the rotational direction of the outer rotor 50 into the CCW or CW direction opposite to the rotational direction of the inner rotor 40 (S518 or S528) to thus implement the reverse rotation driving of the pulsator 130 is applied to cases of requiring fast driving (i.e., fast starting) and forming a strong water stream to increase cleaning capability by reverse rotation according to a medium stream.

Figure 12:
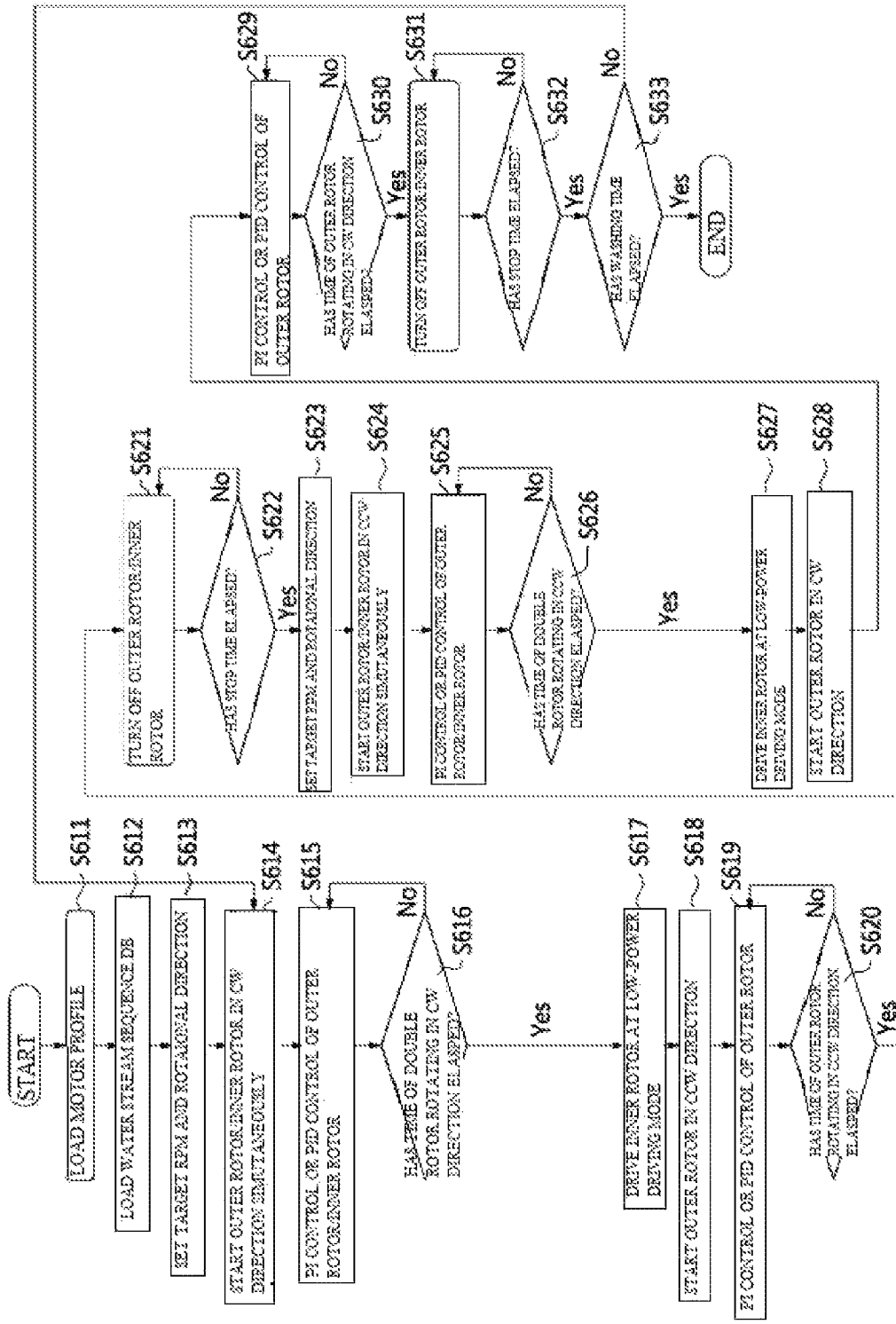

Referring to FIG. 12, a reverse rotation driving method of the pulsator and the washing tub according to the fourth embodiment of the present invention will be described below.

As compared to the third embodiment, a reverse rotation driving method according to the fourth embodiment has a difference from that of the third embodiment, in a point of setting the inner rotor 40 in a low-power driving state, in steps S617 and S627, instead of setting the inner rotor 40 in an intermittent driving and freewheeling state.

Therefore, the reverse rotation driving method according to the fourth embodiment is to set the inner rotor 40 in a low-power driving state (S617), and to change the rotational direction of the outer rotor 50 into the CCW or CW direction opposite to the rotational direction of the inner rotor 40 (S618 or S628) to thus implement the reverse rotation driving of the pulsator 130. Thus, similarly to the third embodiment, the fourth embodiment is applied to cases of requiring fast driving (i.e., fast starting) and forming a strong water stream to increase cleaning capability by reverse rotation according to a medium stream.

In addition, in some embodiments of the present invention, instead of driving the pulsator 130 and the washing tub 120 at different speeds as described above when driving the pulsator 130 and the washing tub 120 in the opposite directions to each other, to thus form a strong water stream in a pattern shape, it is also possible to form a strong water stream in a pattern shape by driving the pulsator 130 and the washing tub 120 at an identical speed or driving the pulsator 130 and the washing tub 120 at variable speeds.

As described above, according to the third and fourth embodiments of the present invention, the washing tub 120 is intermittently driven or driven at a low-power state in the opposite direction to the rotational direction of the pulsator 130 so as to be reversely rotated at the washing and rinsing modes, to thus form a strong water stream to increase cleaning capability.

As described above, in some embodiments of the present invention, the pulsator 130 is reversely rotated, in a state where the pulsator 130 and the washing tub 120 are rotated in one direction, by sequentially driving the outer rotor 50 and the inner rotor 40 at the same time or at time intervals, in one direction to which the washing tub 120 is intended to rotate, in order to avoid interference between the pulsator 130 and the washing tub 120 connected to the outer rotor 50 and the inner rotor 40 as loads, and thus the washing tub 120 is rotated by an inertial force at the time of blocking driving of the inner rotor 40 or at the time of a low power driving mode, thereby minimizing energy consumption and obtaining a mutually opposite direction driving effect by a dual power drive.

In addition, according to some embodiments of the present invention, when initially driving the washing tub 120 by using the inner rotor 40 in the motor driving apparatus for the washing machine using the double rotor motor, the outer rotor 50 and the inner rotor 40 are driven at the same time or time or sequentially driven at time intervals, to thus prevent an initial starting current from being excessively consumed due to insufficient torque of the inner rotor 40 to thereby prevent efficiency from lowering. As a result, it is possible to achieve significant energy savings in the present invention as opposed to prior art technologies.

Furthermore, in some embodiments of the present invention, the reverse rotation driving methods according to the first to fourth embodiments are mutually combined to thus achieve a variety of control methods when driving the washing tub 120 in the opposite direction to the rotational direction of the pulsator 130 at the washing mode and the rinsing mode.

As described above, the present invention has been described with respect to particularly preferred embodiments. However, the present invention is not limited to the above embodiments, and it is possible for one of ordinary skill in the art to make various modifications and variations, without departing off the spirit of the present invention. Thus, the protective scope of the present invention is not defined within the detailed description thereof but is defined by the claims to be described later and the technical spirit of the present invention.

The present invention can be applied to a washing machine driving apparatus using a double rotor motor that may selectively rotate a pulsator and a washing tub, with no separate clutch.

What is claimed are:

1. A method of driving a washing machine which includes a double stator fixed to a lower surface of an outer tub, a first coil and a second coil being provided on an inner side and an outer side of the double stator, respectively; an inner rotor disposed with a gap on an inner circumferential surface of the first coil of the double stator and connected with a washing tub; an outer rotor disposed with a gap on an outer circumferential surface of the second coil of the double stator and connected with a pulsator disposed inside the washing tub, wherein the outer rotor is disposed further away from a rotation axis of the washing tub and the pulsator than the inner rotor; and a control unit configured to apply a first drive signal to the first coil and a second drive signal to the second coil separately from the first drive signal, the method comprising:

driving the inner rotor and the outer rotor in a first direction to thus rotate the washing tub and the pulsator in the first direction;

setting the inner rotor, which has been driven in the first direction, to any one of a free-wheeling mode, and an intermittent driving mode; and during the rotation of both the washing tub and the pulsator in the first direction, driving only the outer rotor in a second direction opposite to the first direction to thus rotate the pulsator in the second direction opposite to that of the washing tub, thereby being able to start, in an efficient way, the washing tub requiring a rotational torque higher than that of the pulsator.

2. The method of claim 1, wherein the driving of the inner rotor and the outer rotor in the first direction comprises: driving the inner rotor and the outer rotor simultaneously in the first direction, or driving the inner rotor and the outer rotor sequentially in the first direction at time intervals.

3. The method of claim 1, wherein the driving of the inner rotor and the outer rotor in opposite directions to each other comprises: driving the inner rotor and the outer rotor at different speeds.

4. The method of claim 1, wherein the driving of the inner rotor and the outer rotor in opposite directions to each other comprises: driving the inner rotor and the outer rotor at variable speeds.

5. The method of claim 1, wherein the driving of the inner rotor and the outer rotor in the first direction comprises: first driving the outer rotor in the first direction and then secondly driving the inner rotor in the first direction at a preset time interval.

6. The method of claim 5, wherein the secondly driving of the inner rotor in the first direction comprises:
   executing a Proportional-Integral (PI) control or a Proportional Integral and Derivative (PID) control so that the rotational speed of the outer rotor reaches a preset round per minute (RPM);
   determining whether the outer rotor has been started normally by executing the PI control or the PID control;
   starting the inner rotor in a state in which the outer rotor is rotationally driven in the first direction; and
   controlling rotational speeds of the inner rotor and the outer rotor so as to reach predetermined RPMs by executing the PI control or the PID control of the inner rotor and the outer rotor.

7. The method of claim 6, wherein the determining is executed by any one of, or a combination of at least two of: determining whether the inner/outer rotor has been driven for a preset time; determining whether a RPM of the outer rotor has reached a preset value; and determining whether an amount of current of the second drive signal applied to the second coil has reached a preset value.

8. The method of claim 1, before the setting, further comprising: determining whether the inner rotor has been normally started in the first direction.

9. The method of claim 8, wherein the determining is executed by any one of, or a combination of at least two of: determining whether the inner/outer rotor has been driven for a preset time; determining whether a RPM of the inner rotor has reached a preset value; determining whether an amount of current of the first drive signal applied to the first coil has reached a preset value.

10. A non-transitory computer readable medium embodied with programs for operating the method recited in claim 1.

* * * * *